F. STEFFENS.
CAR TRUCK.
APPLICATION FILED OCT. 3, 1913.
1,089,163.
Patented Mar. 3, 1914.
3 SHEETS—SHEET 2.
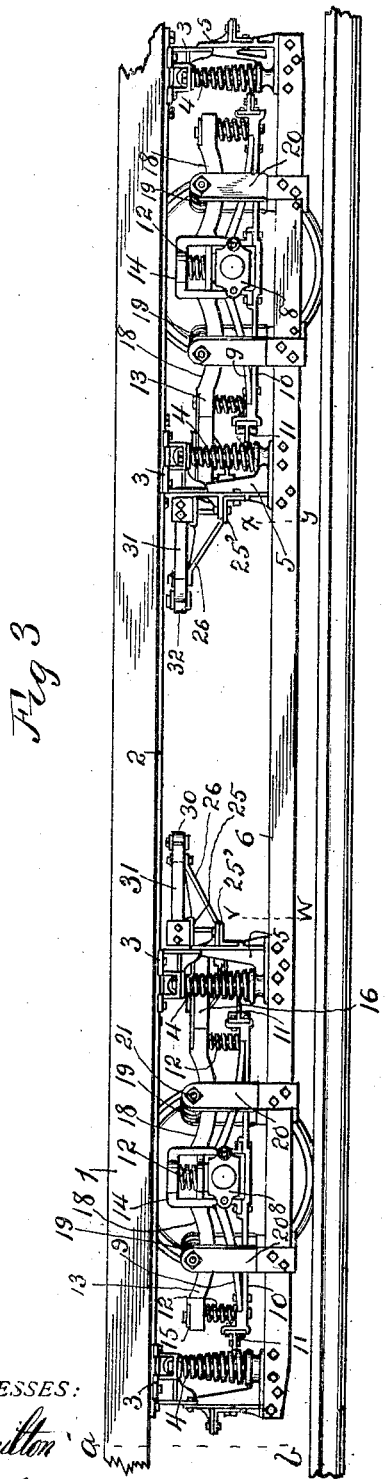
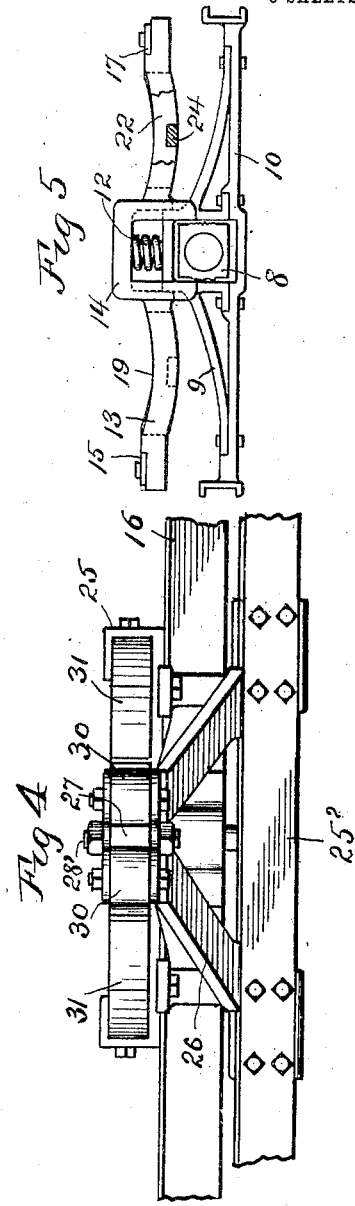
WITNESSES:
R. Hamilton
E. B. House
INVENTOR.
Fred Steffens
BY Warren D. House
His ATTORNEY.

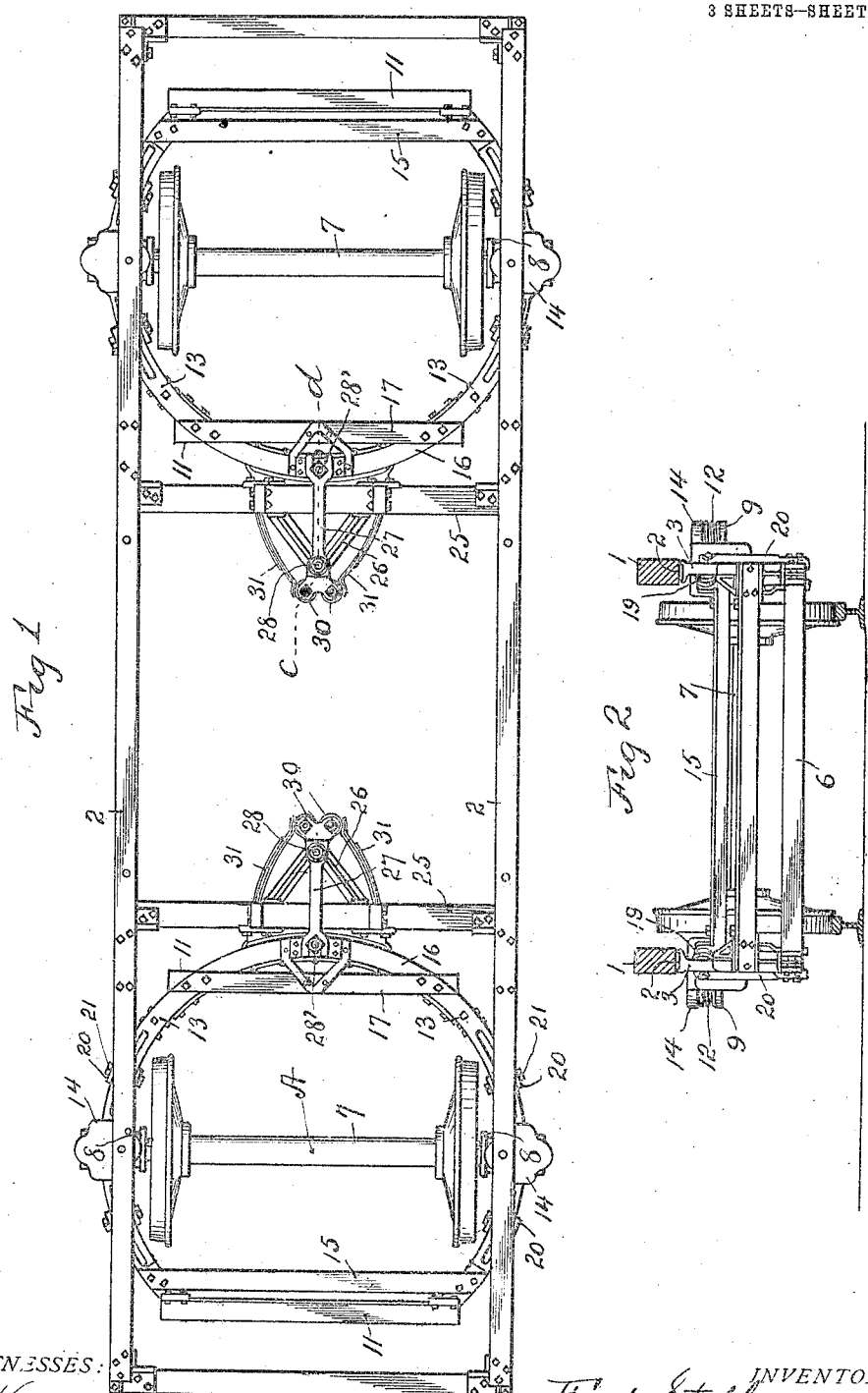

F. STEFFENS.
CAR TRUCK.
APPLICATION FILED OCT. 2, 1913.
1,089,163.
Patented Mar. 3, 1914.
3 SHEETS—SHEET 3.
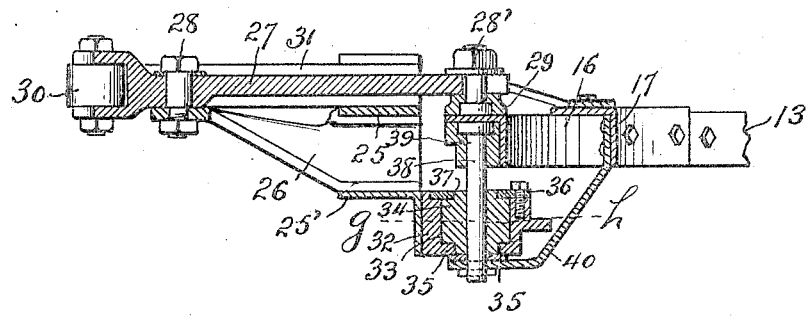
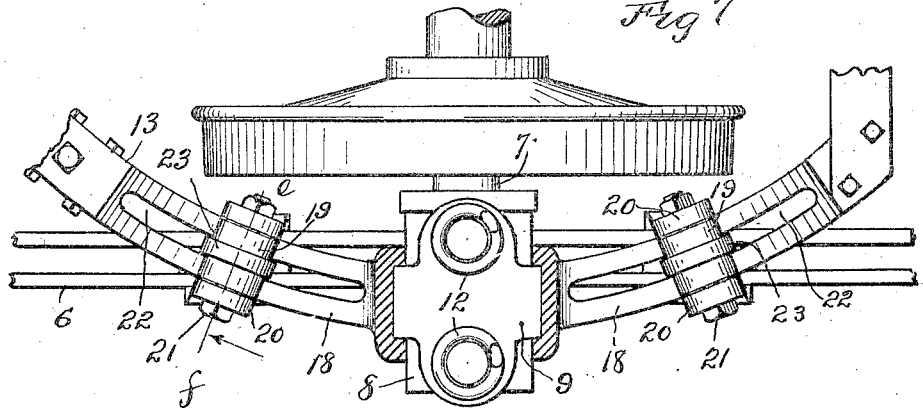
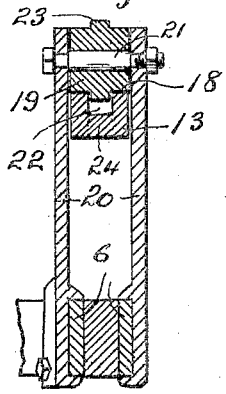
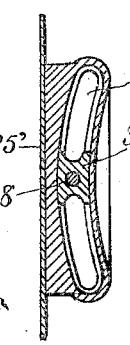
WITNESSES:
R. E. Hamilton
E. B. House
INVENTOR.
Fred Steffens
BY Warren D. House
His ATTORNEY.

250
UNITED STATES PATENT OFFICE.

FRED STEFFENS, OF ST. JOSEPH, MISSOURI.

CAR-TRUCK.

1,089,163.

Specification of Letters Patent.

Patented Mar. 3, 1914.

Application filed October 2, 1913. Serial No. 793,148.

*To all whom it may concern:*

Be it known that I, FRED STEFFENS, a citizen of the United States, residing at St. Joseph, in the county of Buchanan and State of Missouri, have invented a certain new and useful Improvement in Car-Trucks, of which the following is a specification.

My invention relates to improvements in car trucks.

The object of my invention is to provide a novel construction of car truck which, while permitting the employment of a long wheel base, permits the truck to readily turn sharp curves in a track.

My invention provides further novel means for automatically bringing the axle and wheels into their proper positions relative to the car body after turning a curve.

My invention is particularly adapted to single radial axial truck construction.

The novel features of my invention are hereinafter fully described and claimed.

In the accompanying drawings which illustrate the preferred form of my invention, Figure 1 is a plan view of my improved truck mechanism. Fig. 2 is a cross section on the line $a$—$b$ of Fig. 3. Fig. 3 is a side elevation of a portion of a car body which is mounted on a truck mechanism embodying my improvements. Fig. 4 is an end elevation of one of the equalizing mechanisms, enlarged. Fig. 5 is a side elevation of portions of one of the trucks. Fig. 6 is an enlarged vertical sectional view on the line $c$—$d$ of Fig. 1. Fig. 7 is an enlarged fragmental view of portions of one of the trucks, shown partly in plan and partly in horizontal section. Fig. 8 is a section on the line $e$—$f$ of Fig. 7. Fig. 9 is a horizontal section on the line $g$—$h$ of Fig. 6.

Similar reference characters designate similar parts in the different views.

1 designates the sills of a car body having secured to their under sides longitudinal plates 2 to which are secured downwardly extending brackets 3 which rest upon vertical coil springs 4 which are supported by brackets 5 having upwardly extending right angled portions which are slidably engaged by the brackets 3, and which serve to prevent lateral movement of the car body relative to the car body supporting frame 6 which supports the brackets 5.

7 designates the car wheel axles, of which there are one for each truck.

8 designates the ordinary journal boxes which are mounted on the axles 7.

Two trucks are shown supporting the car body. As these are alike in construction a description of one truck will answer for each.

The box 8 is clamped between substantially horizontal upper and lower members 9 and 10, there being two of each of these members for each truck, said members being arcuate in plan view, the center of the arcs being the point A, Fig. 1, which is also the middle point of the axis of the axle 7. Two T bars 11 are secured to the ends of one member 10 and extend transversely across and are secured to corresponding ends respectively of the other member 10 of the truck. The members 9 and 10 and the T bars 11 form the lower truck frame upon which are supported vertical coil springs 12 which support an upper truck frame composed of the following described parts. Two substantially horizontal members 13, which are arcuate in form as viewed from above, the center of the arcs being the point A in Fig. 1, are each provided with an inverted U shaped middle portion 14 the arms of which respectively vertically slidably embrace the adjacent box 8. The arms of the middle portion 14 are bifurcated and embrace opposite edges of the adjacent member 9 of the lower truck frame. One set of ends of the members 13 are respectively secured to the ends of a transverse angle bar 15. The opposite or inner ends of the two members 13 are respectively secured to a horizontal transverse arcuate angle bar 16, the ends of which are also secured to the ends of a straight transverse angle bar 17. Each member 13 at opposite sides of the axle 8 is provided, as shown in Fig. 3, with concavously curved runways 18 on which are respectively mounted rollers 19 adapted normally to rest in the lowest portions of the runways, but which are adapted when the trucks are turning a curve to run up the runways, gravity tending to return the rollers to the lowest positions when the car wheel again run upon a straight track.

The supporting rollers 19 respectively form parts of hangers 20 with which the frame 6 is provided. These hangers are constructed alike, one being shown in Fig. 8, and comprises each two vertical plates 20, the lower ends of which are secured to the frame 6, a horizontal pivot bolt 21 extending through and secured to the plates 20 adjacent to the upper ends thereof, and a roller 19 rotatively mounted on said bolt. The plates 20 are disposed at opposite sides of the adjacent member 13 and thereby serve as guides for said member. Preferably each member 13 is provided with longitudinal slots 22 in which run peripheral flanges respectively provided respectively on the peripheries of the rollers 19. These flanges serve to cut dirt or grease which may accumulate on the upper sides of the curved runways 18, and by running in the curved slots 22, the flanges 23 also serve to guide the members 13. As shown in Fig. 8, the slots 22 may each be crossed by a middle bridge portion 24 to afford strength to the members 13.

To assure the prompt return to the proper position, after turning a curve, of the axles 7, I provide each truck with supplemental spring actuated mechanism comprising the following described parts: Referring to Figs. 1 and 6, 25 and 25′ are cross bars, the latter being secured to brackets 5. 26 is a bracket secured to the bars 25 and 25′ and having pivoted to it, by a vertical pin 28, a horizontal lever 27 one end of which is bifurcated and embraces a vertical bolt 28′, which is secured in a horizontal plate 29 secured to the upper side of the adjacent curved bar 16 of the upper truck frame. Mounted on the other end of the lever 27 are two friction rollers 30 against which respectively bear two leaf springs 31 which are secured to the angle bar 25′ and press toward each other, thereby resisting movement of the lever 27 from the central position shown in Fig. 1. After the car wheels have turned a curve in the track and are on a straight track, the springs 31 assist the hanger rollers 19 in returning the axle and car wheels to their proper position relative to the frame 6.

Secured to the angle bar 25′ is a guide member 32 having a curved slot 33 located in an arc the center of which is the vertical line which intersects the middle of the axis of the adjacent axle 7. In the slot 33 is slidably mounted a block 34 which is mounted on inwardly extending flanges 35. A horizontal longitudinally slotted plate 36 is mounted on top of the guide member 32 to retain the block 34 in the slot 33. The plate 36 is provided with a longitudinal curved slot 37 through which extends a vertical pin 38, the upper end of which is secured in a block 39 which is secured to the arcuate bar 16, the lower end of the pin 38 extending through a bracket 40 which is secured at its upper end to the angle plate 17.

By the employment of a single radial axle in each truck constructed in accordance with the principles of my invention, a long wheel base may be provided and sharp curves in the track readily turned. In going up or down grades the springs 31 insure the proper positioning of the axle relative to the frame 6 in case that the rollers 19 running on the runways 18 did not effect this function.

While I have shown the frame 6 as connecting two trucks, if desired the portion of the frame 6 between the lines v—w and x—y, Fig. 3, may be eliminated, and the frame 6 thus resolved into two separate frames which are respectively connected to the two trucks.

I do not limit my invention to the structures shown and described, as modifications within the scope of the appended claims, may be made without departing from the spirit of my invention.

Having thus described my invention, what I claim and desire to secure by Letters Patent, is:—

1. In a car truck, a car axle, a lower frame, a truck frame, boxes on the axle, springs supported by the boxes and supporting the truck frame, the lower frame having hangers supported by and adapted to travel in a circle upon said truck frame, a car body, and means supported by the lower frame for supporting the car body.

2. In a car truck, a car axle, boxes on the axle, a truck frame, springs supported by the boxes and supporting the truck frame, a lower frame having hangers supported by and adapted to travel in a circle on the truck frame, a car body, means carried by the lower frame for supporting the car body and yielding means connected with the lower frame for normally swinging the truck frame and axle to a predetermined position when they have been swung in either direction past said position.

3. In a car truck, a car axle, boxes on said axle, a truck frame revoluble in a horizontal plane with the axle, springs supported by the boxes and supporting the truck frame, a lower frame having hangers supported by and adapted to travel in a circle on the truck frame, a car body, means carried by said lower frame for supporting the car body, and spring actuated means for returning the truck frame to a predetermined position when it has been swung in either direction past said position.

4. In a car truck, a car axle, boxes on said axle, a lower truck frame supported by said boxes, springs supported by said lower truck frame, an upper truck frame supported by said springs and revoluble in a horizontal plane with said axle, and a car body supporting frame having hangers supported by and adapted to travel in a circle upon the upper truck frame.

5. In a car truck, a car axle, boxes on said axle, a lower truck frame supported by said boxes, springs supported by said lower truck frame, an upper truck frame supported by said springs and revoluble in a horizontal plane with said axle and having concavously curved runways at opposite sides of said axle, and a car body supporting frame having hangers supported by and adapted to travel on said runways.

6. In a car truck, a car axle, boxes on said axle, a lower truck frame supported by said boxes, springs supported by said lower truck frame, an upper truck frame supported by said springs and revoluble with the axle in a horizontal plane and having concavously curved runways disposed in a circle at opposite sides of the axle, and a car body supporting frame having hangers supported by and adapted to travel respectively on said runways.

7. In a car truck, a car axle, boxes on said axle, a truck frame supported by said boxes, a second truck frame, means supported by the first truck frame for supporting the second, a car body supporting frame having hangers supported by and adapted to run in a circle on the second truck frame, and yielding means for resisting the swinging of the second truck frame from a predetermined position.

8. In a car truck, a car axle, boxes on said axle, a truck frame supported by said boxes, a second truck frame having concavously curved runways at opposite sides of said axle, means supported by the first truck frame for supporting the second, and a car body supporting frame having hangers respectively supported by and adapted to travel on said runways.

9. In a car truck, a car axle, boxes on said axle, a truck frame revoluble in a horizontal plane with said axle, means supported by said boxes for supporting said truck frame, a car body supporting frame having hangers disposed at opposite sides of said axle and supported by and adapted to travel upon said truck frame, and yielding means for resisting revoluble movement in either direction of the truck frame relative to the car body supporting frame.

10. In a car truck, a car axle, boxes on said axle, a truck frame revoluble with the axle in a horizontal plane, the truck frame having concavously curved runways at opposite sides of said axle, means supported by said boxes for supporting said truck frame, and a car body supporting frame having hangers respectively supported by and adapted to travel upon said runways.

11. In a car truck, a car axle, boxes on said axle, a truck frame revoluble in a horizontal plane with said axle and having concavously curved runways at opposite sides of said axle, means supported by the boxes for supporting said truck frame, a car body supporting frame having hangers respectively supported by and adapted to travel upon said runways, and spring actuated means for resisting revoluble movement in either direction of the truck frame relative to the car body supporting frame.

12. In a car truck, a car axle, boxes on said axle, a truck frame revoluble in a horizontal plane with said axle and having concavously curved runways at opposite sides of said axle, means supported by the boxes for supporting said truck frame, and a car body supporting frame having supporting rollers respectively supported by and adapted to travel upon said runways.

13. In a car truck, a car axle, boxes on said axle, a truck frame revoluble in a horizontal plane with said axle and having concavously curved runways at opposite sides of said axle, means supported by the boxes for supporting said truck frame, a car body supporting frame having supporting rollers respectively supported by and adapted to run on said runways, and spring actuated means for resisting revoluble movement in either direction of the truck frame relative to the car body supporting frame.

14. In a car truck, a car axle, boxes on said axle, a truck frame revoluble in a horizontal plane with said axle and having concavously curved runways disposed in a circle at opposite sides of said axle, means supported by the boxes for supporting the truck frame, and a car body supporting frame having supporting rollers respectively carried by and adapted to run on said runways.

15. In a car truck, a car axle, boxes on said axle, a truck frame revoluble in a horizontal plane with said axle and having concavously curved runways disposed at opposite sides of the axle, means supported by the boxes for supporting the truck frame, a car body, springs supporting the car body, and a frame supporting said springs and having supporting rollers respectively mounted on said runways.

16. In a car truck, a car axle, boxes on said axle, a truck frame revoluble in a horizontal plane with said axle and having concavously curved runways at opposite sides of said axle, means supported by said boxes for supporting the truck frame, a car body, springs supporting the car body, and a frame supporting said springs and having hangers respectively supported by and adapted to run on said runways.

17. In a car truck, a car axle, boxes on said axle, a truck frame revoluble in a horizontal plane with said axle and having concavously curved runways at opposite sides of said axle, means including springs supported by said boxes and supporting said truck frame, a car body, springs supporting the car body, and a frame supporting the last named springs and having supporting members respectively supported by and adapted to run on said runways.

18. In a car truck, a car axle, boxes on said axle, a truck frame revoluble in a horizontal plane with said axle and having concavously curved runways at opposite sides of the axle, a second truck frame supported by said boxes, springs supported by the second truck frame and supporting the first truck frame, a car body, springs supporting said car body, and a frame supporting the last named springs and having supporting members respectively mounted upon and adapted to run on said runways.

In testimony whereof I have signed my name to this specification in presence of two subscribing witnesses.

FRED STEFFENS.

Witnesses:
 WARREN D. HOUSE,
 E. B. HOUSE.

Copies of this patent may be obtained for five cents each, by addressing the "Commissioner of Patents, Washington, D. C."